(12) United States Patent
Hill, III

(10) Patent No.: US 11,466,564 B2
(45) Date of Patent: Oct. 11, 2022

(54) SYSTEMS AND METHODS FOR DOWNHOLE MEMORY TOOL ACTIVATION AND CONTROL

(71) Applicant: HALLIBURTON ENERGY SERVICES, INC., Houston, TX (US)

(72) Inventor: Freeman Lee Hill, III, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 363 days.

(21) Appl. No.: 16/432,808

(22) Filed: Jun. 5, 2019

(65) Prior Publication Data

US 2019/0383135 A1 Dec. 19, 2019

Related U.S. Application Data

(60) Provisional application No. 62/684,520, filed on Jun. 13, 2018.

(51) Int. Cl.
| | |
|---|---|
| *E21B 47/12* | (2012.01) |
| *G06F 1/3206* | (2019.01) |
| *E21B 49/08* | (2006.01) |
| *E21B 49/00* | (2006.01) |
| *E21B 47/00* | (2012.01) |

(52) U.S. Cl.
CPC ............. *E21B 47/12* (2013.01); *E21B 47/00* (2013.01); *E21B 49/00* (2013.01); *E21B 49/08* (2013.01); *G06F 1/3206* (2013.01)

(58) Field of Classification Search
CPC .......... E21B 47/12; E21B 47/00; E21B 49/00; E21B 49/08; E21B 43/04; E21B 47/06; G06F 1/3206; G06F 3/0673; H02J 7/00; G01V 5/045
See application file for complete search history.

(56) References Cited

U.S. PATENT DOCUMENTS

| | | | |
|---|---|---|---|
| 6,554,065 B2 * | 4/2003 | Fisher ..................... | E21B 43/04 |
| | | | 166/250.02 |
| 6,684,951 B2 | 2/2004 | Restarick et al. | |
| 8,312,923 B2 | 11/2012 | Patel et al. | |
| 10,073,659 B2 * | 9/2018 | Alexander ............ | G06F 3/0673 |
| 2011/0248566 A1 | 10/2011 | Purkis | |
| 2016/0084034 A1 | 3/2016 | Roane et al. | |
| 2017/0328199 A1 * | 11/2017 | Marsh ..................... | E21B 47/06 |
| 2018/0106927 A1 * | 4/2018 | Larimore ............... | G01V 5/045 |
| 2019/0393451 A1 * | 12/2019 | Ishihara ................... | H02J 7/00 |

* cited by examiner

*Primary Examiner* — Catherine T. Rastovski
*Assistant Examiner* — Kaleria Knox
(74) *Attorney, Agent, or Firm* — Novak Druce Carroll LLP

(57) ABSTRACT

Disclosed are systems and methods for receiving, by at least one processor, a first indication to transition from a powered-off state to a low power standby state, in response to the first indication, obtaining, by the at least one processor, from at least one sensor at least one sensor measurement comprising data corresponding to a downhole environment, determining, by the at least one processor, that the at least one sensor measurement exceeds a particular threshold comprising a second indication and transitioning from the low power standby state to a logging state, in response to the second indication, capturing, by the at least one processor, the data corresponding to the downhole environment, and storing, by the at least one processor, the data corresponding to the downhole environment.

20 Claims, 9 Drawing Sheets

SYSTEMS AND METHODS FOR DOWNHOLE MEMORY TOOL ACTIVATION AND CONTROL

CROSS REFERENCE TO RELATED APPLICATIONS

This application claims the benefit of priority to U.S. Appl. No. 62/684,520 filed Jun. 13, 2018, entitled Systems and Methods for Downhole Memory Tool Activation and Control, the entire contents of which is hereby incorporated herein by reference.

TECHNICAL FIELD

The present technology pertains to downhole activities, and more specifically to activating or triggering downhole tools and memory devices using one or more surface cues or sensed downhole activities.

BACKGROUND

Some downhole systems utilize signage and static markers and tags to activate downhole tools at a particular location in relation to the signage and gather information associated with the tool. Other downhole systems may activate a downhole tool at a particular preset time and gather information associated with the tool. However, in many instances, the particular time of importance may be incorrect or inaccurate or unknown. In addition, the static marker may not be indicative of a situation or particular time of importance for the downhole tool. The downhole tool may be activated at an inaccurate time and/or location. As a result, the downhole tool may collect and store information that inefficiently utilizes at least one of computer-readable storage associated with the tool, network bandwidth, network throughput, computer-readable memory associated with the tool, and limited battery or power associated with the tool, among others.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
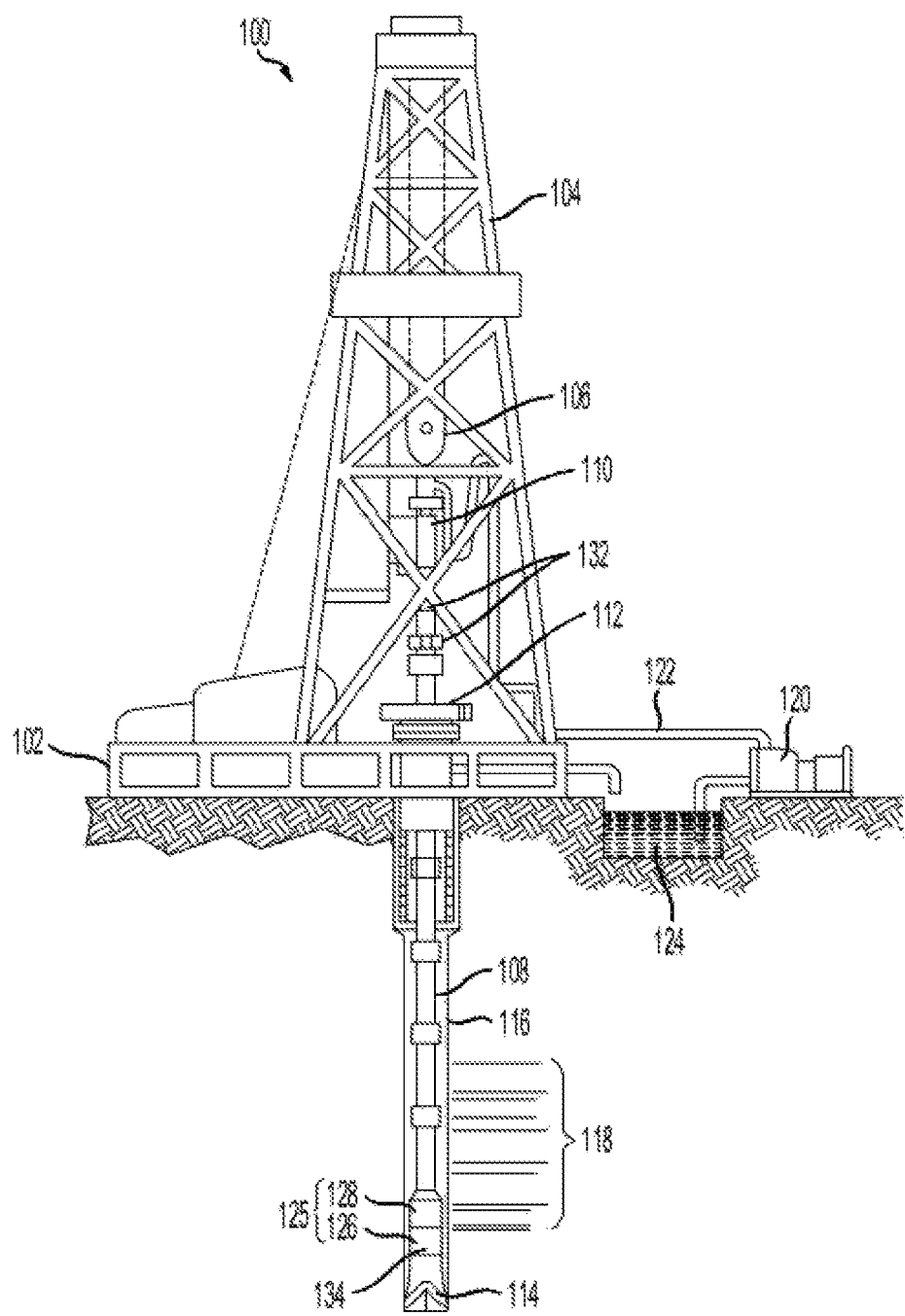
FIG. 1A is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below, will be readily apparent to those skilled in the art with the aid of this disclosure upon reading the following detailed description, and by referring to the accompanying drawings.

Disclosed herein are systems, methods, and computer-readable storage media for activating or triggering one or more downhole tools or memory devices based at least in part on one or more surface cues and sensed downhole activities.

Downhole memory tools and devices can be installed in various different manners, including, but not limited to, tethering, within a carrier, within a pipe, etc. Regardless of how a downhole memory tool is installed, it remains necessary to provide a control system governing one or more of the operation of the downhole memory tool itself and the activation of a specific activity or sub-component of the downhole memory tool. For example, during gravel or fracture packing operations, a downhole memory tool might be conveyed via washpipe to obtain measurements and other data after completion of the packing operation(s). Data is requested on the gravel pack, but there must be a set of stimuli that are recognized by the downhole memory tool and cause it to trigger or otherwise turn on and operate. Therefore, it is desirable to control and trigger a downhole memory tool using one or more of surface cues and sensed downhole activities.

According to at least one aspect, an example method for activating or triggering one or more downhole tools or memory devices based at least in part on one or more surface cues and sensed downhole activities is provided. The method can include receiving, by at least one processor, a first indication to transition from a powered-off state to a low power standby state, in response to the first indication, obtaining, by the at least one processor, from at least one sensor at least one sensor measurement comprising data corresponding to a downhole environment, determining, by the at least one processor, that the at least one sensor measurement exceeds a particular threshold comprising a second indication and transitioning from the low power standby state to a logging state, in response to the second indication, capturing, by the at least one processor, the data corresponding to the downhole environment, and storing, by the at least one processor, the data corresponding to the downhole environment.

According to at least one aspect, an example system for activating or triggering one or more downhole tools or memory devices based at least in part on one or more surface cues and sensed downhole activities is provided. The system can include a downhole tool disposed in a wellbore, the downhole tool comprising at least one sensor, at least one processor in communication with the downhole tool, the at least one processor coupled with at least one computer-readable storage medium having stored therein instructions which, when executed by the at least one processor, causes the system to receive a first indication to transition from a powered-off state to a low power standby state, in response to the first indication, obtain from the at least one sensor at least one sensor measurement comprising data corresponding to a downhole environment, determine that the at least one sensor measurement exceeds a particular threshold comprising a second indication and transition from the low power standby state to a logging state, in response to the second indication, capture the data corresponding to the downhole environment, and store the data corresponding to the downhole environment.

According to at least one aspect, an example non-transitory computer-readable storage medium for activating or triggering one or more downhole tools or memory devices based at least in part on one or more surface cues and sensed downhole activities is provided. The non-transitory computer-readable storage medium can include instructions which, when executed by one or more processors, cause the one or more processors to perform operations including receiving a first indication to transition from a powered-off state to a low power standby state, in response to the first indication, obtaining from at least one sensor at least one sensor measurement comprising data corresponding to a downhole environment, determining that the at least one sensor measurement exceeds a particular threshold comprising a second indication and transitioning from the low power standby state to a logging state, in response to the second indication, capturing the data corresponding to the downhole environment, and storing the data corresponding to the downhole environment.

In some aspects, the systems, methods, and non-transitory computer-readable storage media described above can include a tool such as a pulsed neutron tool to perform the operations as discussed above in response to the first indication and the second indication. The tool may be in communication with the at least one sensor including a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor, among others. In addition, the tool and/or the sensor may receive the first indication to transition from the powered-off state to the low power standby state from a computing device located on a surface above the downhole environment. Alternatively, the tool and/or the sensor may determine or measure in the downhole environment, the first indication to transition from the powered-off state to the low power standby state.

The tool and/or the sensor may dynamically sense in real-time, the first indication to transition from the powered-off state to the low power standby state. In addition, the tool may determine the particular threshold based on one of an instantaneous threshold value, a rolling threshold value, a windowed threshold value, and a continuous threshold value.

Figure 7:
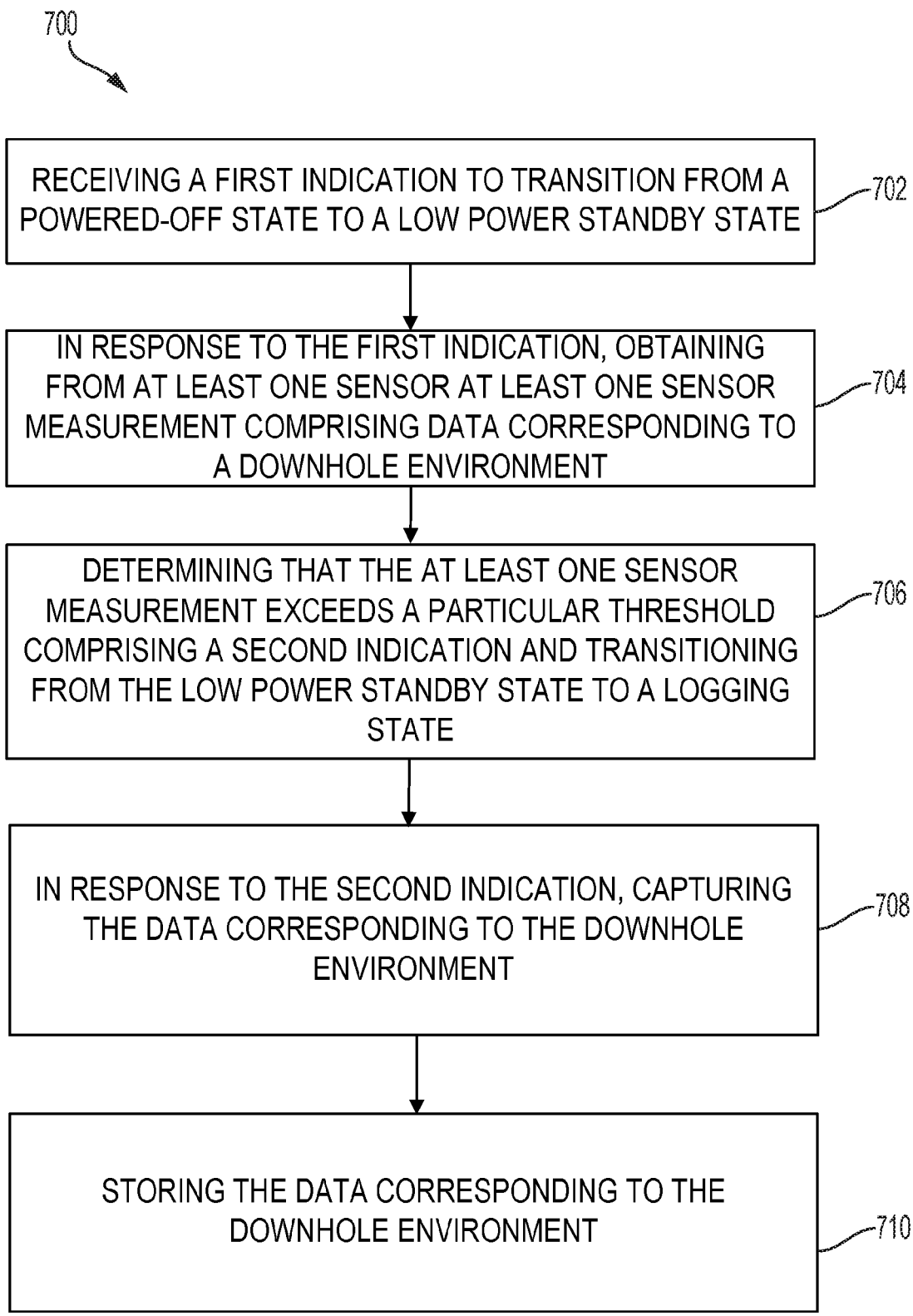
FIG. 7 is a flowchart of an example method for activating and/or triggering downhole tools and memory devices, in accordance with some examples.
Figure 8:
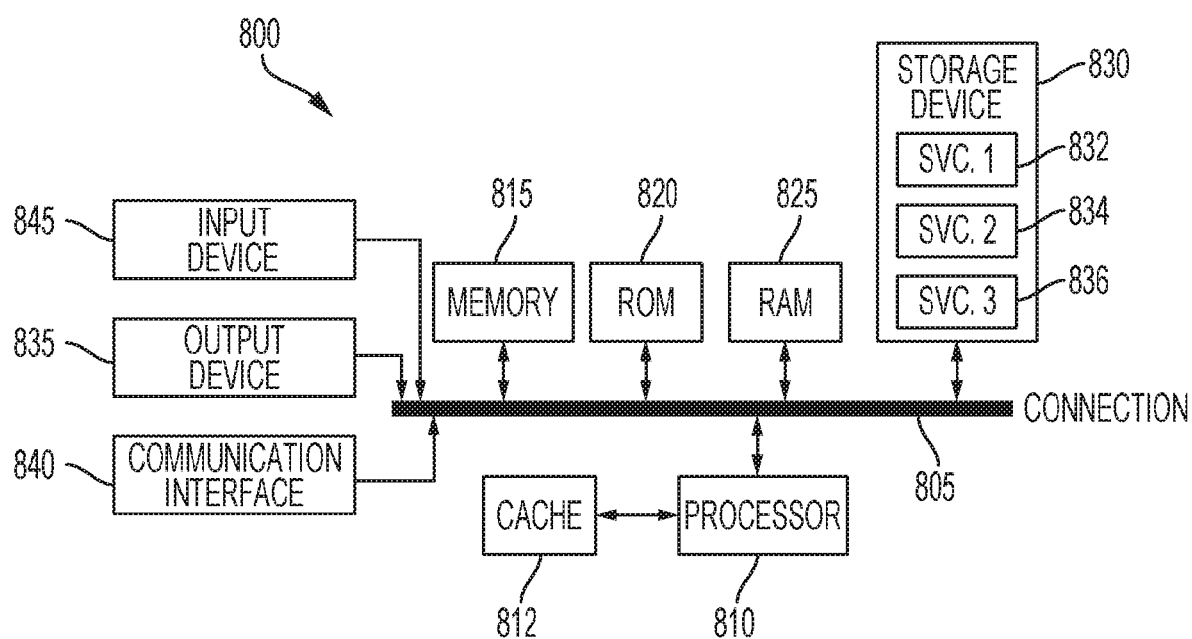
FIG. 8 is a schematic diagram of an example computing device architecture, in accordance with some examples.

As follows, the disclosure will provide a more detailed description of the systems, methods, computer-readable media and techniques herein for activating or triggering one or more downhole tools or memory devices based at least in part on one or more surface cues and sensed downhole activities. The disclosure will begin with a description of example systems and environments, as shown in FIGS. 1A through 6. A description of example methods and technologies for activating or triggering one or more downhole tools or memory devices based at least in part on one or more surface cues and sensed downhole activities, as shown in FIG. 7, will then follow. The disclosure concludes with a description of an example computing system architecture, as shown in FIG. 8, which can be implemented for performing computing operations and functions disclosed herein. These variations shall be described herein as the various embodiments are set forth.

FIG. 1A illustrates a schematic view of a logging while drilling (LWD) wellbore operating environment 100 in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
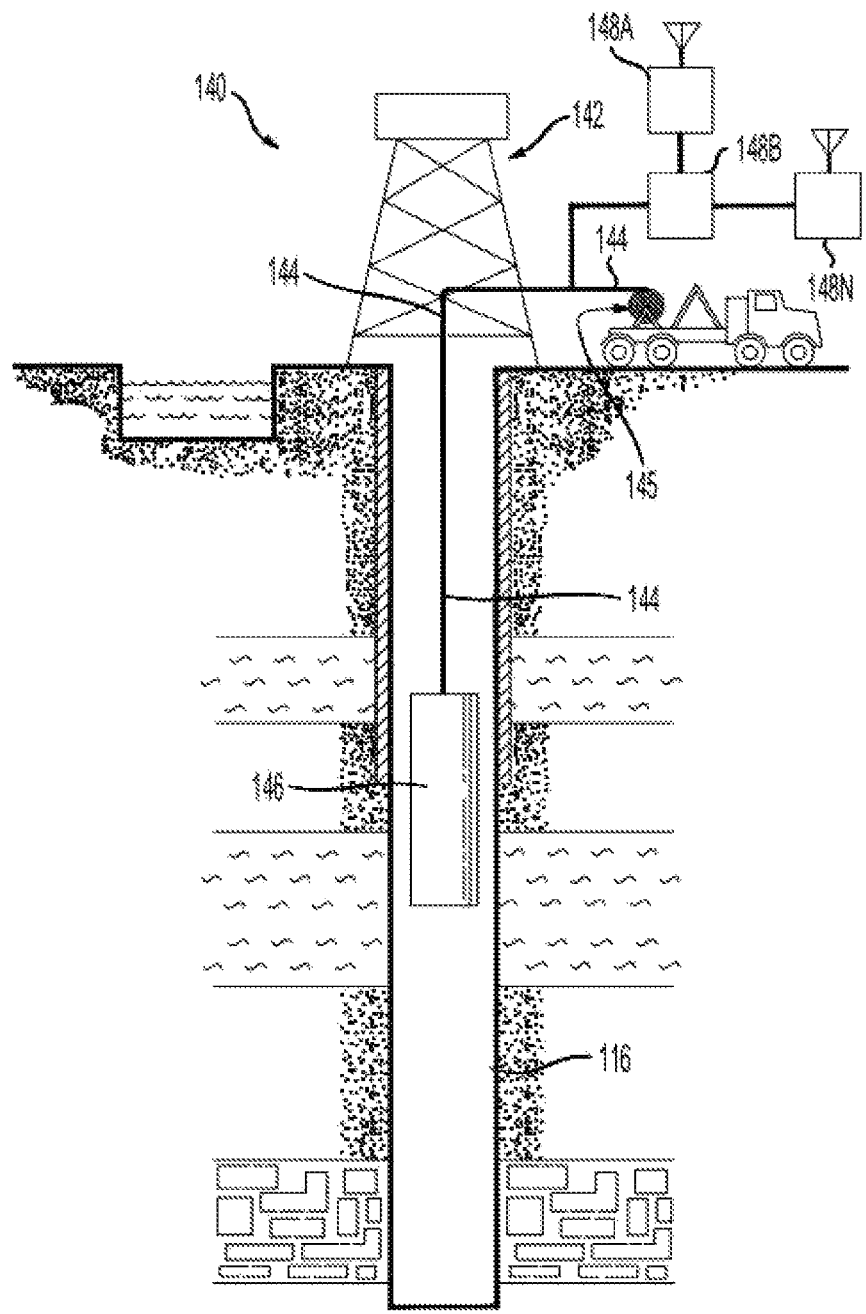
FIG. 1B is a schematic diagram of an example downhole environment with a conveyance in accordance with some examples.

FIG. 1B illustrates an example system 140 for downhole line detection in a downhole environment with a conveyance and can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a conveyance 144 can be used. The tool body 146 can include a logging tool. The tool body 146 can be lowered into the wellbore 116 by conveyance 144. The conveyance 144 can be anchored in the drill rig 145 or a portable means such as a truck. The conveyance 144 can include one or more wires, slicklines, cables, and/or the like, as well as tubular conveyances such as coiled tubing, joint tubing, or other tubulars, and may include a downhole tractor.

The illustrated conveyance 144 provides support for the tool, as well as enabling communication between tool processors 148A-N on the surface and providing a power supply. In some examples, the conveyance 144 can include electrical and/or fiber optic cabling for carrying out communications. The conveyance 144 is sufficiently strong and flexible to tether the tool body 146 through the wellbore 116, while also permitting communication through the conveyance 144 to one or more processors 148A-N, which can include local and/or remote processors. Moreover, power can be supplied via the conveyance 144 to meet power requirements of the tool. For slickline or coiled tubing configurations, power can be supplied downhole with a battery or via a downhole generator.

Disclosed herein are systems and methods for activating or triggering one or more downhole tools or memory devices based at least in part on one or more surface cues and sensed downhole activities. In some embodiments, a two-part or greater trigger sequence comprising two or more trigger events can be utilized such that a downhole tool or memory device is fully activated to capture desired measurements and sensor data only once each trigger event in the multi-part trigger sequence has been activated, thereby better ensuring that the downhole tool or memory device is activated only once a desired/correct time and/or location is achieved.

With respect to conventional techniques, in many scenarios, downhole logging operations are planned well in advance, for example, it is known when/where desired logging operation(s) should occur and thus strict scheduling is employed to trigger a downhole memory tool (alternatively referred to herein as a downhole memory device) or some other downhole tool. Conventional scheduling and triggering are often entirely temporal in nature, operating off of a timer or elapsed time measurement, for example, triggering a downhole memory tool at 04:15:37 (using the hh:mm:ss format). However, temporal approaches require significant advance effort to characterize and model the downhole environment and/or the downhole operation in order to properly determine the trigger times needed.

Other conventional triggers to activate a downhole tool can be based on simple and easily detectable factors such as the initiation or termination of a given downhole operation, the initiation or termination of a particular step or sub-component of the given downhole operation, or a physical tag or marker. For example, some downhole systems employ radioactive tags placed at known locations—movement past a radioactive tag corresponds to an increase in measured radioactive activity, and one or more such measurements are utilized as a trigger to activate a downhole tool or memory device. However, the use of such radioactive tags can be highly dependent upon the specific downhole operation(s) and are not always reliable, meaning that one or more downhole tools or memory devices may be activated or turned on when they should not have. For example, during operation, downhole tools and pipes can move across a radioactive tag (for example, installed on the completion or elsewhere) numerous times, due to normal downhole operations or unintended correctional or other operations. Because the radioactive tag triggering is not dynamic, it does not account for such unintended or unforeseen movements across the radioactive tag, and any deviation from the planned operations used to calculate the triggering threshold for a downhole tool can cause early triggering.

Such concerns of premature activation are typically mitigated by using radioactive tags only with certain types of downhole tools and memory devices that are shorter and do not require large amounts of energy, and hence can run for protracted amounts of time without undue negative effects. However, when high-power tools such as pulsed neutron tools are used, the activation sequence or trigger must be initiated at a point in time that is far closer to, if not substantially coincident with, the time at which the high-power tool is needed.

In general, real-world scenarios often present more complex and nuanced dynamics than are assumed in the conventional approaches described above, and accordingly, prevent any of the corresponding simplistic or static determinations of an appropriate trigger or activation time for a downhole tool or memory device to be made.

For example, it can often be the case that a downhole memory tool will not need to be activated until some point in time that is several hours, days, or even weeks after the initiation or termination of a given downhole operation. Over increasingly long activation intervals, it becomes increasingly difficult to characterize an activation trigger or activation time in a static manner—the more elapsed time, the more unpredictable the downhole dynamics and downhole environment become, meaning that the same measurement might need to be triggered at two drastically different times for two different downhole environments.

Further still, in many instances, only a short window of opportunity may exist for a downhole memory tool to obtain a desired measurement of one or more downhole events or downhole operations, in which case an appropriately robust and sensitive trigger system is desirable. For example, a short window of opportunity for measurement may arise due to the nature of the downhole event, for example, for a fleeting event the downhole memory tool must be activated just prior to or otherwise concurrent with the downhole event, in which case accurate and highly sensitive triggering is needed. In some scenarios, certain design considerations of the downhole memory tool (and the corresponding or associated measurement system with which the tool is incorporated) can be used to alleviate the need for high accuracy triggering, for example, if the downhole memory tool is a relatively low-power tool and/or the desired measurement is a relatively low bandwidth measurement, the downhole memory tool might be configured to obtain data continuously in order to ensure that the fleeting downhole event will be recorded. However, this is similar to the conventional radioactive tag approach described above, in that these design and control considerations are most generally applicable for use with downhole events that are not measured over an extended period of time, and further, are generally incompatible with high-power tools such as pulsed neutron tools and are instead limited to use with low-power downhole tools and memory devices.

Additionally, such design and control considerations are not always feasible or cost effective, as a given downhole tool will almost always be constrained, in any given moment, to some currently available maximum recording time. The currently available maximum recording time can depend on numerous factors, including but not limited to: the remaining power supply to the downhole tool (for example, tool may deplete batteries after five minutes), the available power supply to the downhole tool (for example, tool has high power draw that can only be satisfied by a capacitor bank with a fifteen second discharge time), the remaining data storage space of the downhole tool (for example, tool records to on-board memory and only has storage space for five minutes of measurement data), and the available bandwidth to the downhole tool (for example, downhole wireless bandwidth is limited and tool cannot reserve bandwidth to measure and transmit continuously), among others. No matter the specific combination of factors which dictate the current maximum recording time of a tool, there is generally little margin for error in triggering, as triggering early may cause the downhole memory tool to exceed its current maximum recording time before the downhole event of interest has concluded, and triggering late will cause the downhole memory tool to miss the beginning of the downhole event of interest.

Accordingly, it would be desirable to provide highly robust, highly accurate systems and methods for controlling and activating downhole memory tools using one or more surface cues and sensed downhole activities.

In particular, improved triggering systems and methods would be useful in scenarios in which the timing or scheduling of logging events are unknown and the downhole memory tool cannot run continuously or for extended periods of time. In such scenarios, various different trigger events, derived, for example, from one or more surface cues and sensed downhole activities, can be utilized to properly activate the downhole memory tool to capture desired measurements and sensor data.

In some embodiments, a two-part or greater trigger sequence comprising two or more trigger events, linked or un-linked, can be utilized such that a downhole tool or memory device is fully activated to capture desired measurements and sensor data only once each trigger event in the multi-part trigger sequence has fired (for example, each trigger event has been activated and/or fulfilled), thereby better ensuring that the downhole tool or memory device is activated only once a desired/correct time and/or location is achieved.

In the case of a multi-part trigger sequence, it is contemplated that the two or more constituent trigger events will create a series of checks on the activation of the downhole tool or memory device such that it is only activated precisely when needed for logging or measurement purposes, and not before and not after. In some embodiments, a first trigger event can be an initialization or arming trigger such that the firing of the first trigger causes the downhole memory device to power on and initialize from an "off" state to a low-power "standby" state. The firing of the first trigger event can then initialize a second trigger event, such that the second trigger event begins accepting or searching for data and measurements that fall within one or more predetermined parameters or thresholds configured to cause the second trigger event to fire. The firing of the second trigger event can then activate the downhole tool or memory device from the low-power "standby" state to a fully "on" state such that the downhole tool or memory device begins capturing measurement data as desired. This is what is referred to as a linked multi-part trigger—multiple trigger events both transmit commands to the downhole tool/memory device, for example, the first trigger event commands the low-power "standby" state and the second trigger event commands the fully "on" state.

If a multi-part trigger is un-linked, then only the final trigger event transmits commands to the downhole tool/memory device and all prior trigger events may be conditions of the final trigger event. In such a scenario, the final trigger event might transmit a single command to cause the downhole tool/memory device to transition from the "off" state to the fully "on" state, or the final trigger event might transmit a series of commands to sequentially move the downhole tool/memory device from the "off" state to the low-power "standby" state to the fully "on" state, among other states.

Various triggering methods and trigger events are described below. Each triggering method has its strengths and weaknesses, particularly when considered in the context of the dynamic operations and downhole environments in which they may be utilized according to one or more aspects of the present disclosure. As noted previously, the use of one trigger event may make the proper timing of the activation of a downhole memory tool quite difficult. In other words, the activation of the memory tool becomes solely dependent upon the timing of the trigger event, and more specifically, the success of its planning and execution.

The use of multiple trigger events, arranged serially, in parallel, or some combination of serial/parallel, avoids issues of false triggering and early triggering, as is found to occur in conventional triggering processes such as triggering based on a particular time, signage, and other static markers, some of which were discussed above (for example, radioactive tag triggering). The use of multiple trigger events mitigates or eliminates false positives by using one or more initialization trigger events to place initialization conditions not only on the downhole tool/memory device, but also on all subsequent trigger events between the initialization trigger event and the downhole tool/monitoring device.

In contrast to conventional triggering, the disclosed multi-part trigger sequences and the constituent trigger events are: time-independent, flexible to operational changes, independent of waiting times, compatible with tethered and un-tethered tools, and, able to turn on a downhole tool or memory device from a surface cue, able to turn on a downhole tool or memory device from a programmed downhole sequence, or both.

A downhole memory tool can be configured to utilize one or more existing sensors and/or one or more expressly provided sensors for the purpose of collecting data fed into a multi-part trigger sequence or some other plurality of trigger events. In some embodiments, the one or more sensors can include, but are not limited to: pressure sensors, motion sensors, optical sensors, flow sensors, viscosity sensors, density sensors, temperature sensors, Hall Effect sensors, magnetic tag sensors, radioactive counters, radioactive tag sensors, vibration sensors, resistivity sensors, conductivity sensors, acoustic sensors, ultrasonic sensors, telemetry sensors, torque and RPM sensors, gyroscopic sensors, and gas-detection sensors, among others.

In some embodiments, the trigger events can fire based on an analysis of one or more measured or computed values derived from sensor data, with various examples of such analysis briefly presented below. The sensor data can be utilized in a raw form (for example, as received from a sensor) or a transformed form (for example, pre-processed, such as noise reduction, filtering, among others). One or multiple channels of sensor data can be utilized, and sensor measurements can be combined as desired, according to one or more algorithms or mathematical relationships to produce a derived value from the sensor data, wherein the derived value is utilized for the comparison and evaluation purposes below. In some embodiments, the sensor data can be real-time or can be historical or otherwise previously collected. In some embodiments, the threshold values and analytical criteria can be static (for example, manually or automatically pre-defined) or dynamic (manually or automatically updated, in response to sensor data or other decision factors).

Presented below is a brief listing illustrating various analytical processes that may be executed or monitored for in order to fire a given trigger event. Note that the described measurement values can comprise singular or combined sensor data, which itself can be raw, transformed, or derived sensor data that is real-time data or historical data. For purposes of clarity and illustration, each analytical process is described as a determination of whether the measurement value(s) is/are greater than or less than a threshold value. In addition, other comparison types and analyses are possible without departing from the scope of the present disclosure. Accordingly, the analytical and thresholding processes underlying the firing of various trigger events can include:

Instantaneous Threshold: A single measurement value is greater than or less than a threshold value.
Rolling Threshold: The average of the last x measurement values is greater than or less than a threshold value.
Windowed Threshold: The average of the measurement values obtained in the last y seconds is greater than or less than a threshold value.
Continuous Threshold: The average of all measurement values obtained since the trigger event initialized is greater than or less than a threshold value.

The listing above is not comprehensive and is provided for purposes of illustration and clarity—it is not intended to be construed as limiting. The above listing discusses the use of discrete measurement values themselves, but higher order time derivatives could also be calculated and used as a basis of analysis, for example, rather than comparing F(t), a sensed value at time t, to a threshold, F'(t) or F"(t), first and second time derivatives at time t respectively, could be compared to a threshold, and so on.

Additionally, rather than comparing values to thresholds, trends over time or patterns could be analyzed against one or more thresholds or criteria in order to fire a trigger event, for example, a trigger event might fire in response to a sensed value tripling in value at an exponential rate and then reaching and maintaining a steady state for at least five seconds.

Advantageously, the presently disclosed systems and methods for robust multi-factor triggering permits downhole tool(s) and/or memory device(s) to be activated only when needed and precisely when needed, avoiding the undesirable early/late/false activations that are commonly associated with conventional triggering methods. The present disclosure can be employed when large swings in time are anticipated or known to be present, and further still, is able to control and bring about downhole logging when the timing of one or more (or all) of the desired logging operations and events to be logged are unknown, on the basis that the present disclosure provides for fine-tuned triggering control with high accuracy and high precision. For example, according to one or more aspects of the present disclosure, a pulsed neutron log can be used to log a well using pipe, washpipe, or any other type of downhole conveyance, even though the logging time will vary. The pulsed neutron log could be configured within the workstring during workover such that measurements can be taken after the job or downhole operation has been completed, when the workstring is being pulled back out of the hole. Using one or more multi-stage triggers comprising two or more trigger events as disclosed herein, the logging operations can be properly and accurately initiated even though the downhole dynamics and operating conditions of the logging tools during the workstring removal are unknown.

The presently disclosed systems and methods for logging similarly could be utilized for logging in drillpipe, and also for the replacement of open hole (OH) logging tools with pulsed neutron. The presently disclosed systems and methods could further be utilized for advanced slickline operations, digital spectralog (DSL) operations, and in most interventions. In some embodiments, the presently disclosed systems and methods could be utilized to activate or control other downhole tools and devices for purposes other than logging.

Figure 2:
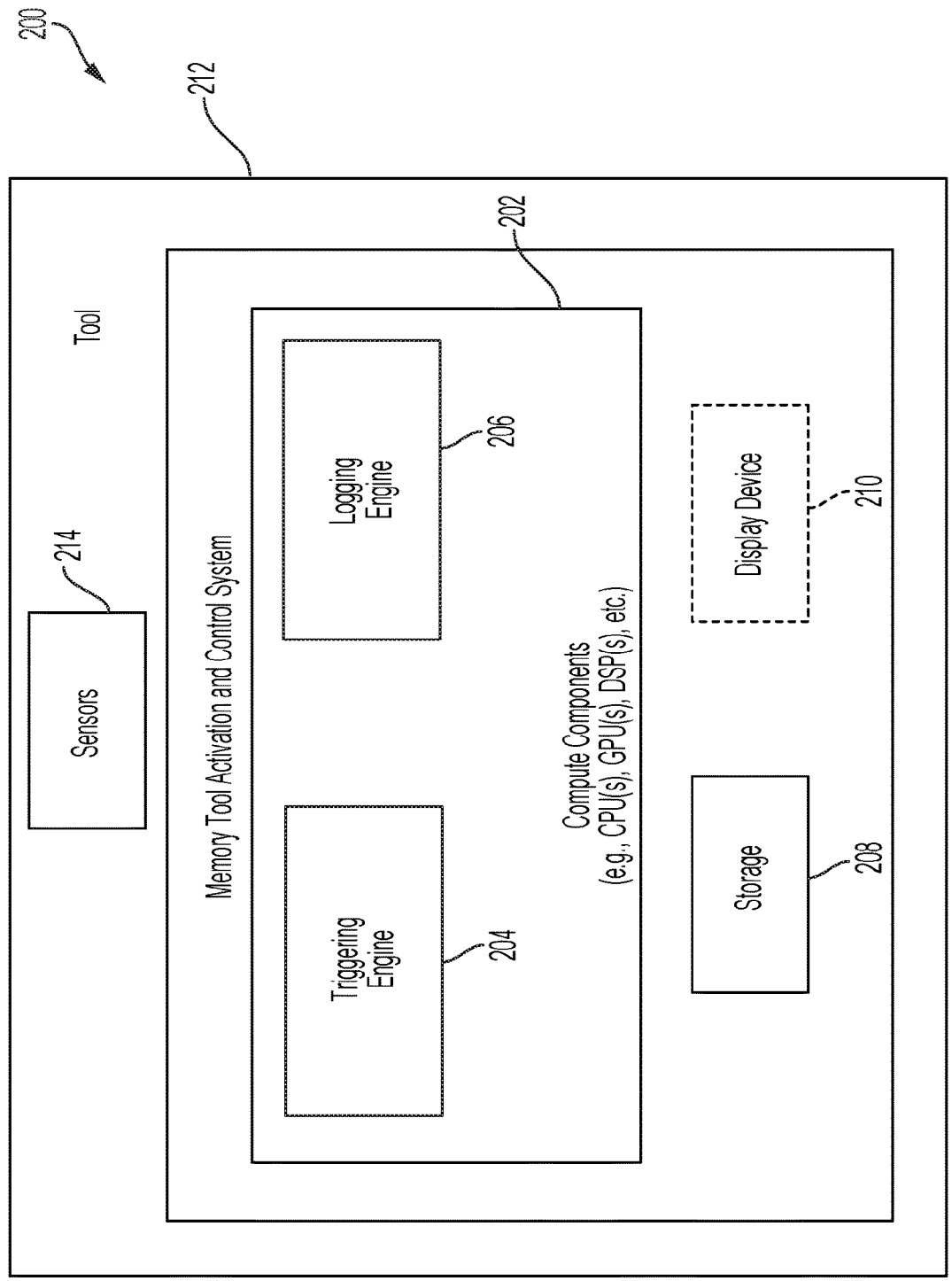
FIG. 2 is a block diagram of an example downhole memory tool activation and control system which may be implemented to activate and/or trigger downhole tools and memory devices, in accordance with some examples.

FIG. 2 illustrates an example memory tool activation and control system 200. The memory tool activation and control system 200 can be implemented for activating and/or triggering downhole tools and memory devices as described herein. In this example, the memory tool activation and control system 200 can include compute components 202, triggering engine 204, logging engine 206, a storage 208, a tool or device 212, and at least one sensor 214. In some implementations, the memory tool activation and control system 200 can also include a display device 210 for displaying data and graphical elements such as images, videos, text, simulations, and any other media or data content.

The tool 212 may be disposed in the wellbore 116 and is a downhole tool or device that determines and stores information as received from the at least one sensor 214 based at least in part on one or more surface indications, notifications, or cues and sensed downhole activities. The compute components 202 may be disposed in the tool 212 or in another location. The tool 212 may be a low power tool or a high power tool such as a pulsed neutron tool. The at least one sensor 214 may be pressure sensors, motion sensors, optical sensors, flow sensors, viscosity sensors, density sensors, temperature sensors, Hall Effect sensors, magnetic tag sensors, radioactive counters, radioactive tag sensors, vibration sensors, resistivity sensors, conductivity sensors, acoustic sensors, ultrasonic sensors, telemetry sensors, torque and RPM sensors, gyroscopic sensors, and gas-detection sensors, among others.

The memory tool activation and control system 200 can be part of, or implemented by, one or more computing devices, such as one or more servers, one or more personal computers, one or more processors, one or more mobile devices (for example, a smartphone, a camera, a laptop computer, a tablet computer, a smart device, etc.), and/or any other suitable electronic device. In some cases, the one or more computing devices that include or implement the memory tool activation and control system 200 can include one or more hardware components such as, for example, one or more wireless transceivers, one or more input devices, one or more output devices (for example, display device 210), the one or more sensors 214 (for example, an image sensor, a temperature sensor, a pressure sensor, an altitude sensor, a proximity sensor, an inertial measurement unit, etc.), one or more storage devices (for example, storage system 208), one or more processing devices (for example, compute components 202), etc.

As previously mentioned, the memory tool activation and control system 200 can include compute components 202. The compute components can be used to implement the triggering engine 204, the logging engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The triggering engine 204 can be used to process data, analyze data, and activate/or trigger the memory tool activation and control system 200. The triggering engine 204 can receive a first indication, first notification, first trigger, or first cue from a computing device located on the surface above the downhole environment or based on a first indication, first notification, first trigger, or first cue as sensed by the sensors 214 and/or the tool 212. The sensors 214 may include a timing circuit or incorporate a timing circuit. The tool 212 may transition from a powered-off state or first state to a low power standby state or second state so that the sensors 214 either begin collecting sensor measurements or transition from obtaining a first level of sensor measurements to a second level of sensor measurements. The second level of sensor measurements may be more robust than the first level of sensor measurements. As a result, the sensors 214 may begin accepting or searching for data and measurements that fall within one or more predetermined parameters or thresholds configured to cause a next indication, or second indication. In response to the first indication, the triggering engine 204 may obtain from the at least one sensor 214 at least one sensor measurement comprising data corresponding to a downhole environment. The first indication may be based on an indication provided from the surface and/or sensed downhole activities.

Next, the triggering engine 204 may determine that the at least one sensor measurement from the at least one sensor 214 exceeds a particular threshold or is less than a particular threshold, or is within two different parameters or thresholds that comprises a second indication, second notification, second trigger, or second cue. The triggering engine 204 may transition from the low power standby state or second state to a logging state or third state. This logging state or third state may be a fully on state such that the sensors 214 capture data. The second indication may be based on an indication provided from the surface and/or sensed downhole activities. At this point, the sensors 214 may begin to collect an even more robust level of sensor measurements. In addition, the triggering engine 204 may notify the logging engine 206 to begin logging and capturing the data from the at least one sensor 214. This allows the logging engine 206 to operate and log data for a short window of opportunity for the tool 212 and the sensors 214 to obtain information associated with one or more downhole events or operations. As an example, the short window of opportunity may arise due to the nature of the downhole event. In such a case, the tool 212 and the sensors 214 should be activated just prior to or otherwise concurrent with the downhole event. This can assist in saving power supply for the tool 212 and sensors 214. In addition, this ensures that the logging engine 206 does not unnecessarily waste storage space and/or memory for the memory tool activation and control system 200. In addition, this can assist in ensuring that bandwidth is not wasted for the memory tool and activation control system 200.

As another example, the second indication may be determined by the triggering engine 204 based on a trend of the data associated with the sensor measurement over a particular period of time or a pattern of the data that may be analyzed in comparison with one or more thresholds or criteria. As an example, the second indication may occur when data associated with the at least one sensor measurement triples in value at an exponential rate and then reaches and maintains a steady level for at least five seconds. Other examples of exemplary changes or shifts in data are possible.

When in the logging state or the third state, the logging engine 206 may receive, capture, and log the data from the at least one sensor comprising the at least one sensor measurement and store the data corresponding to the downhole environment in the storage 208. In one example, the logging engine 206 may begin to capture data from the at least one sensor 214 associated with pressure sequences, motion changes, maximum pressure, minimum pressure, temperature changes, a radioactive tag, and a magnetic tag, among others. As a result, the tool 212 can be turned on when desired, may handle large gaps in time between capturing data in order to ensure that storage usage is minimized and power usage of the tool 212 is minimized, and the tool is able to log data associated with the downhole activities and environment when timing is unknown.

The tool 212 may be a pulsed neutron tool to perform the operations as discussed above in response to the first indication and the second indication. The tool 212 may be in communication with the at least one sensor 214 including a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor, among others. In addition, the tool 212 may receive the first indication to transition from the powered-off state to the low power standby state from a computing device located on a surface above the downhole environment. Alternatively, the tool 212 and/or the at least one sensor 214 may determine or measure in the downhole environment, the first indication to transition from the powered-off state to the low power standby state.

The tool 212 and/or the at least one sensor 214 may dynamically sense in real-time, the first indication to transition from the powered-off state to the low power standby state. In addition, the tool 212 may determine the particular threshold based on one of an instantaneous threshold value, a rolling threshold value, a windowed threshold value, and a continuous threshold value, as discussed below.

The storage 208 can be any storage device(s) for storing data. In some examples, the storage 208 can include a buffer or cache for storing data for processing by the compute components 202. Moreover, the storage 208 can store data from any of the components of the memory tool activation and control system 200. For example, the storage 208 can store input data used by the memory tool activation and control system 200, outputs or results generated by the memory tool activation and control system 200 (for example, data and/or calculations from the triggering engine 204, the logging engine 206, etc.), user preferences, parameters and configurations, data logs, documents, software, media items, GUI content, and/or any other data and content.

While the memory tool activation and control system 200 is shown in FIG. 2 to include certain components, one of ordinary skill in the art will appreciate that the memory tool activation and control system 200 can include more or fewer components than those shown in FIG. 2. For example, the memory tool activation and control system 200 can also include one or more memory components (for example, one or more RAMs, ROMs, caches, buffers, and/or the like), one or more input components, one or more output components, one or more processing devices, and/or one or more hardware components that are not shown in FIG. 2.

Figure 3:
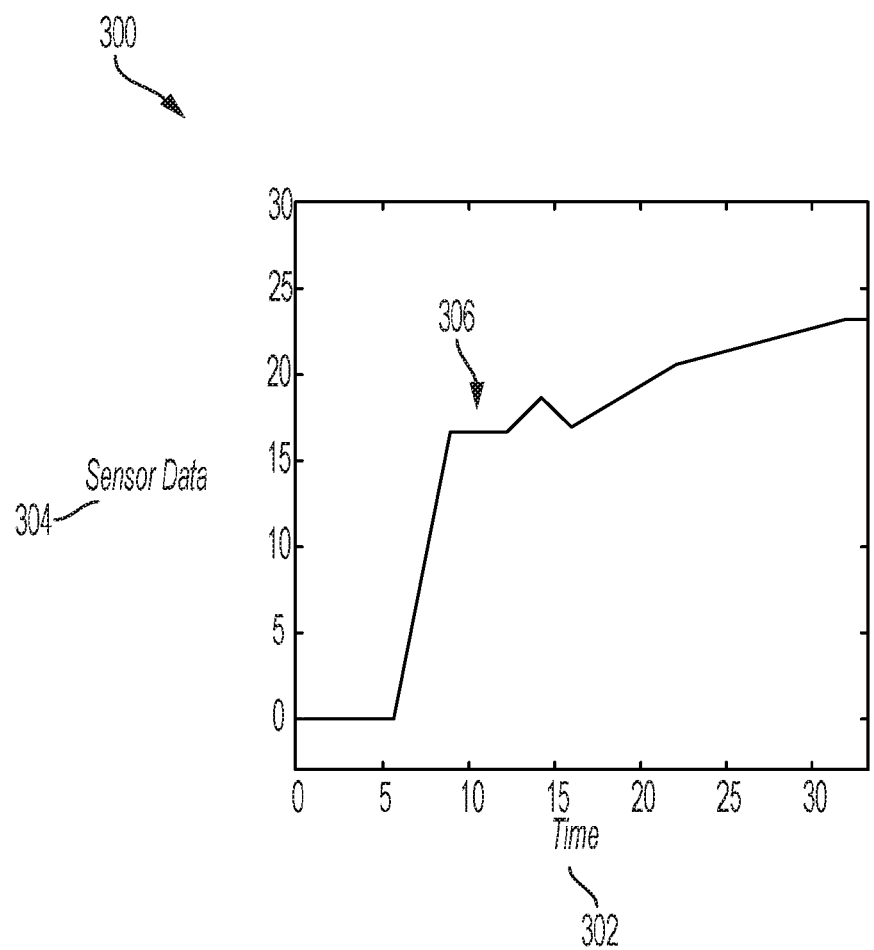
FIG. 3 is a graph of sensor data demonstrating an instantaneous threshold, in accordance with some examples.

FIG. 3 illustrates a graph 300 of sensor data showing an instantaneous threshold according to an example. As shown in FIG. 3, increments of time 302 are shown along one axis of the graph and sensor data 304 from one or more of the sensors 214 is shown along another axis of the graph. The graph illustrates the sensor data over time and at a particular time 306 it can be determined whether the sensor data is over an instantaneous threshold. As an example, the instantaneous threshold may be ten. It may be determined that the current sensor data exceeds the instantaneous threshold, is less than the instantaneous threshold, or is within one or more predetermined parameters or thresholds. This can be used to provide a second indication and capture logging data associated with the one or more sensors 214. In one example, the tool 212 may transition from the low power standby state to the logging state or the fully on state such that the tool 212 and the sensors 214 capture data as desired. At this point, the sensors 214 may begin to collect an even more robust level of sensor measurements. In addition, the triggering engine 204 may notify the logging engine 206 to begin logging and capturing the data from the at least one sensor 214.

Figure 4:
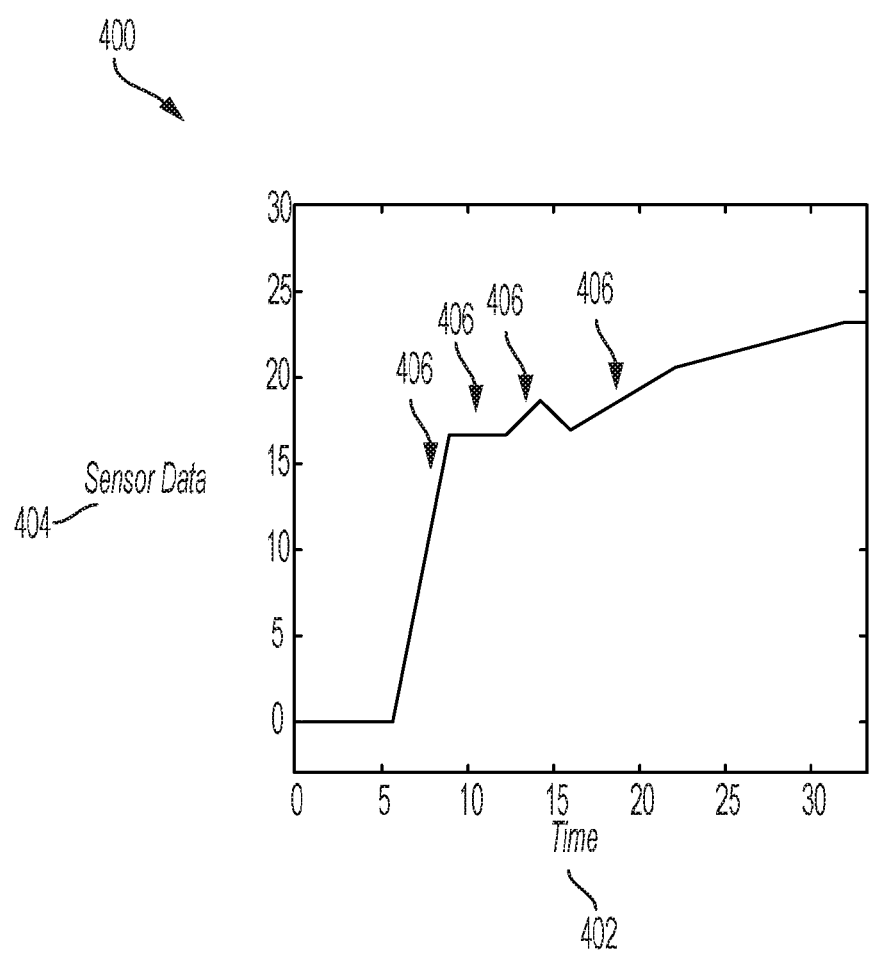
FIG. 4 is a graph of sensor data demonstrating a rolling threshold, in accordance with some examples.

FIG. 4 illustrates a graph 400 of sensor data showing a rolling threshold according to an example. As shown in FIG. 4, increments of time 402 are shown along one axis of the graph and sensor data 404 from one or more of the sensors 214 is shown along another axis of the graph. The graph illustrates the sensor data over time at a plurality of different particular times. Using the sensor data from the plurality of different particular times 406, it can be determined whether the sensor data is over a rolling threshold based on the average of the last x measurement values. As an example, the rolling threshold may be ten. It may be determined that the sensor data exceeds the rolling threshold, is less than the rolling threshold, or is within one or more predetermined parameters or thresholds. This can be used to provide a second indication and capture logging data associated with the one or more sensors 214. In one example, the tool 212 may transition from the low power standby state to the logging state or the fully on state such that the tool 212 and the sensors 214 capture data as desired. At this point, the sensors 214 may begin to collect an even more robust level of sensor measurements. In addition, the triggering engine 204 may notify the logging engine 206 to begin logging and capturing the data from the at least one sensor 214.

Figure 5:
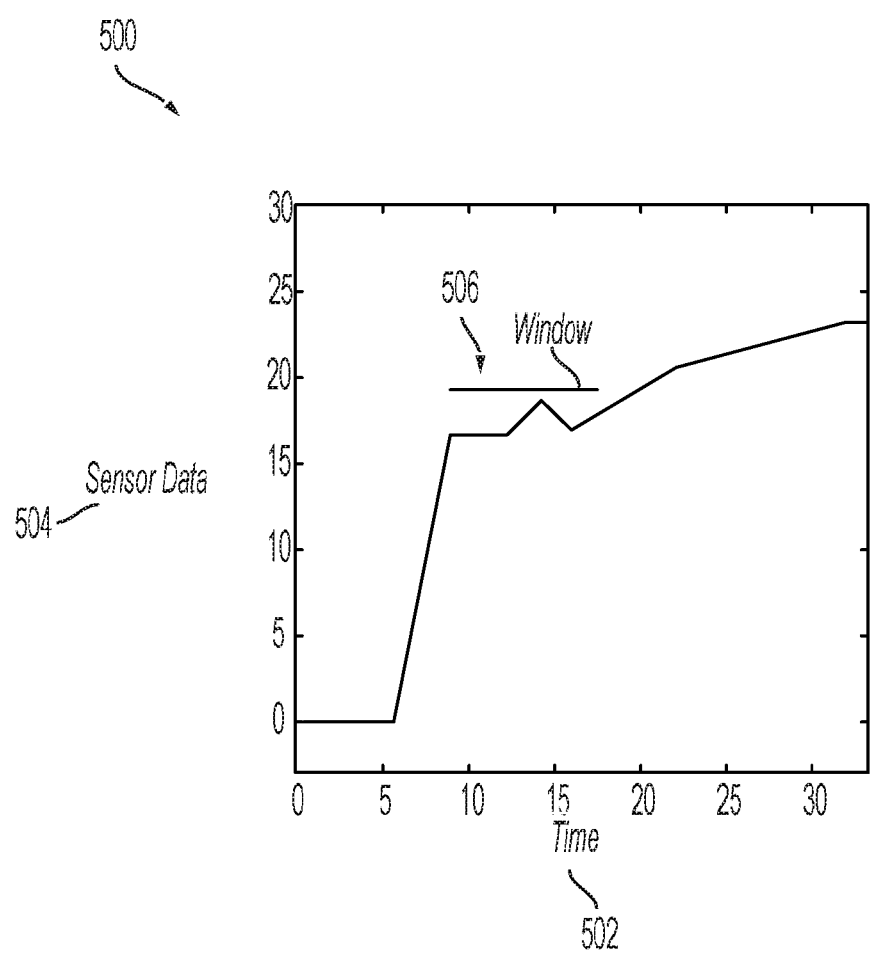
FIG. 5 is a graph of sensor data demonstrating a windowed threshold, in accordance with some examples.

FIG. 5 illustrates a graph 500 of sensor data showing a windowed threshold according to an example. As shown in FIG. 5, increments of time 502 are shown along one axis of the graph and sensor data 504 from one or more of the sensors 214 is shown along another axis of the graph. The graph illustrates the sensor data over a window of time 506. Using the sensor data from the window of time, it can be determined whether the sensor data is over a windowed threshold by determining the average of the measurement values obtained during a period of time and determining whether the average of the measurement values is greater than or less than a threshold value. As an example, the windowed threshold may be ten during the period of time associated with the threshold. It may be determined that the sensor data exceeds the windowed threshold, is less than the windowed threshold, or is within one or more predetermined parameters or thresholds. This can be used to provide a second indication and capture logging data associated with the one or more sensors 214. In one example, the tool 212 may transition from the low power standby state to the logging state or the fully on state such that the tool 212 and the sensors 214 capture data as desired. At this point, the sensors 214 may begin to collect an even more robust level of sensor measurements. In addition, the triggering engine 204 may notify the logging engine 206 to begin logging and capturing the data from the at least one sensor 214.

Figure 6:
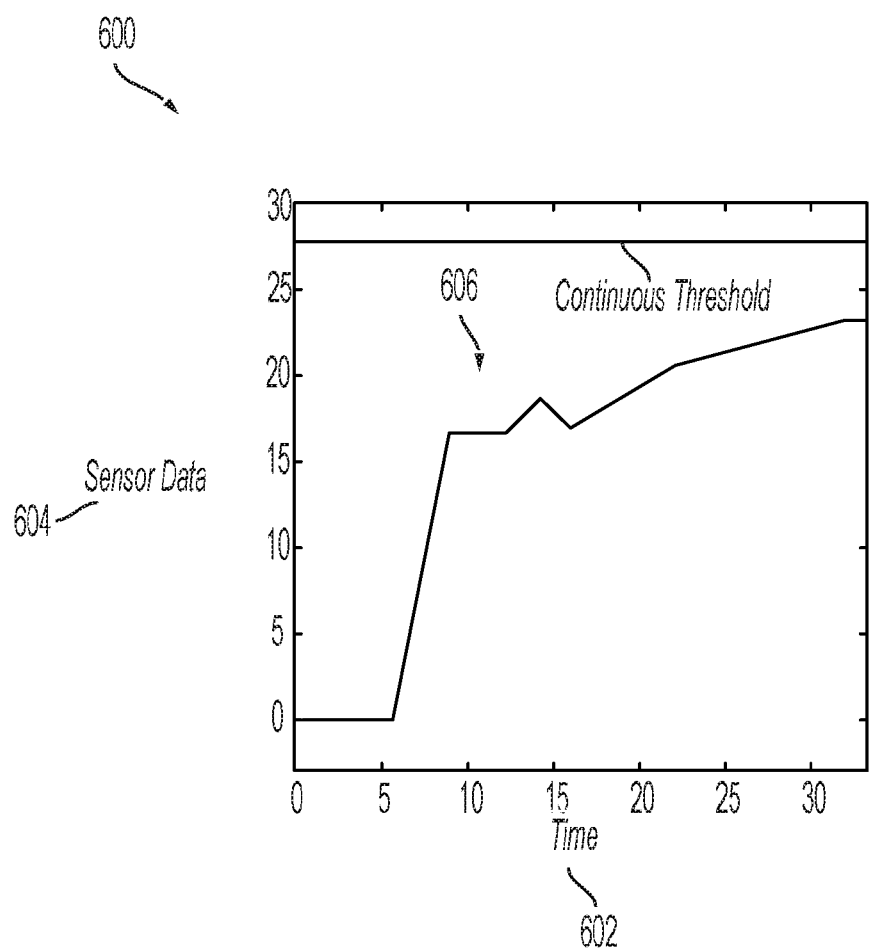
FIG. 6 is a graph of sensor data demonstrating a continuous threshold, in accordance with some examples.

FIG. 6 illustrates a graph 600 of sensor data showing a continuous threshold according to an example. As shown in FIG. 6, increments of time 602 are shown along one axis of the graph and sensor data 604 from one or more of the sensors 214 is shown along another axis of the graph. The graph illustrates the sensor data since a first indication or trigger 606. Using the sensor data since the first indication or trigger, it can be determined whether the sensor data is over a continuous threshold by determining the average of all measurement values obtained since the first indication and determining whether the average of all the measurement values is greater than or less than a threshold value. As an example, the continuous threshold may be ten during the period of time associated with the threshold. It may be determined that the sensor data exceeds the continuous threshold, is less than the continuous threshold, or is within one or more predetermined parameters or thresholds. This can be used to provide a second indication and capture logging data associated with the one or more sensors 214. In one example, the tool 212 may transition from the low power standby state to the logging state or the fully on state such that the tool 212 and the sensors 214 capture data as desired. At this point, the sensors 214 may begin to collect an even more robust level of sensor measurements. In addition, the triggering engine 204 may notify the logging engine 206 to begin logging and capturing the data from the at least one sensor 214.

FIG. 7 illustrates an example method 700 for activating and/or triggering downhole tools and memory devices. For the sake of clarity, the method 700 is described in terms of the memory tool activation and control system 200, as shown in FIG. 2, configured to practice the method. The steps outlined herein are exemplary and can be implemented in any combination thereof, including combinations that exclude, add, or modify certain steps.

At step 702, the memory tool activation and control system 200 can receive a first indication, first notification, first trigger, or first cue to transition from a powered-off state/a first state to a lower power standby state/second state. At step 704, in response to the first indication, the memory tool activation and control system 200 can obtain from at least one sensor, at least one sensor measurement comprising data corresponding to a downhole environment. The at least one sensor may include one or more of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor, among others. In addition, the at least one sensor measurement may include data from one or more of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor, among others.

At step 706, the memory tool activation and control system 200 can determine that the at least one sensor measurement exceeds a particular threshold comprising a second indication, second notification, second trigger, or second cue and transition from the low power standby state to a higher power or logging state to begin logging, capturing, and collecting data from the at least one sensor. In another example, the at least one sensor measurement may be less than a particular threshold or may be between one or more predetermined parameters or thresholds. As another example, the second indication may be based on a trend of the data associated with the sensor measurement over a particular period of time or a pattern of the data that may be analyzed in comparison with one or more thresholds or criteria. As an example, the second indication may occur when data associated with the at least one sensor measurement triples in value at an exponential rate and then reaches and maintains a steady level for at least five seconds. Other examples are possible.

At step 708, in response to the second indication, the memory tool activation and control system 200 can capture and log the data corresponding to the downhole environment. The data may be from the at least one sensor and comprise the at least one sensor measurement. At step 710, the memory tool activation and control system 200 can store the data corresponding to the downhole environment in the storage 208 or in another location.

The tool 212 may be a pulsed neutron tool to perform the operations as discussed above in response to the first indication and the second indication. The tool 212 may be in communication with the at least one sensor 214 including a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor, among others. In addition, the tool 212 may receive the first indication to transition from the powered-off state to the low power standby state from a computing device located on a surface above the downhole environment. Alternatively, the tool and/or the at least one sensor 214 may determine or measure in the downhole environment, the first indication to transition from the powered-off state to the low power standby state.

The tool 212 and/or the at least one sensor 214 may dynamically sense in real-time, the first indication to transition from the powered-off state to the low power standby state. In addition, the tool 212 may determine the particular threshold based on one of an instantaneous threshold value, a rolling threshold value, a windowed threshold value, and a continuous threshold value, as discussed below.

Having disclosed example systems, methods, and technologies for activating or triggering one or more downhole tools or memory devices based at least in part on one or more surface cues and sensed downhole activities, the disclosure now turns to FIG. 8, which illustrates an example computing device architecture 800 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

FIG. 8 illustrates an example computing device architecture 800 of a computing device which can implement the various technologies and techniques described herein. For example, the computing device architecture 800 can implement the system 200 shown in FIG. 2 and perform various steps, methods, and techniques disclosed herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (for example, microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the Disclosure Include:

Statement 1: A method comprising receiving, by at least one processor, a first indication to transition from a powered-off state to a low power standby state, in response to the first indication, obtaining, by the at least one processor, from at least one sensor at least one sensor measurement comprising data corresponding to a downhole environment, determining, by the at least one processor, that the at least one sensor measurement exceeds a particular threshold comprising a second indication and transitioning from the low power standby state to a logging state, in response to the second indication, capturing, by the at least one processor, the data corresponding to the downhole environment, and storing, by the at least one processor, the data corresponding to the downhole environment.

Statement 2: A method according to Statement 1, wherein the at least one sensor is at least one member selected from the group of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor.

Statement 3: A method according to any of Statements 1 and 2, further comprising receiving the first indication to transition from the powered-off state to the low power standby state from a computing device located on a surface above the downhole environment.

Statement 4: A method according to any of Statements 1 through 3, further comprising measuring, by the at least one sensor, the first indication to transition from the powered-off state to the low power standby state.

Statement 5: A method according to any of Statements 1 through 4, further comprising dynamically sensing, by the at least one sensor, the first indication to transition from the powered-off state to the low power standby state.

Statement 6: A method according to any of Statements 1 through 5, further comprising dynamically sensing in real-time, by the at least one sensor, the first indication to transition from the powered-off state to the low power standby state.

Statement 7: A method according to any of Statements 1 through 6, wherein the particular threshold comprises one of an instantaneous threshold value, a rolling threshold value, a windowed threshold value, and a continuous threshold value.

Statement 8: A system comprising a downhole tool disposed in a wellbore, the downhole tool comprising at least one sensor, at least one processor in communication with the downhole tool, the at least one processor coupled with at least one computer-readable storage medium having stored therein instructions which, when executed by the at least one processor, causes the system to: receive a first indication to transition from a powered-off state to a low power standby state, in response to the first indication, obtain from the at least one sensor at least one sensor measurement comprising data corresponding to a downhole environment, determine that the at least one sensor measurement exceeds a particular threshold comprising a second indication and transition from the low power standby state to a logging state, in response to the second indication, capture the data corresponding to the downhole environment, and store the data corresponding to the downhole environment.

Statement 9: A system according to Statement 8, wherein the at least one sensor is at least one member selected from the group of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor.

Statement 10: A system according to any of Statements 8 and 9, the at least one processor further to receive the first indication to transition from the powered-off state to the low power standby state from a computing device located on a surface above the downhole environment.

Statement 11: A system according to any of Statements 8 through 10, the at least one processor further cause the at least one sensor to measure the first indication to transition from the powered-off state to the low power standby state.

Statement 12: A system according to any of Statements 8 through 11, the at least one processor further cause the at least one sensor to dynamically sense the first indication to transition from the powered-off state to the low power standby state.

Statement 13: A system according to any of Statements 8 through 12, the at least one processor further cause the at least one sensor to dynamically sense in real-time the first indication to transition from the powered-off state to the low power standby state.

Statement 14: A system according to any of Statements 8 through 13, wherein the particular threshold comprises one of an instantaneous threshold value, a rolling threshold value, a windowed threshold value, and a continuous threshold value.

Statement 15: A system according to any of Statements 8 through 14, wherein the at least one processor is disposed in the downhole tool.

Statement 16: A non-transitory computer-readable storage medium comprising instructions stored on the non-transitory computer-readable storage medium, the instructions, when executed by one more processors, cause the one or more processors to perform operations including: receiving a first indication to transition from a powered-off state to a low power standby state, in response to the first indication, obtaining from at least one sensor at least one sensor measurement comprising data corresponding to a downhole environment, determining that the at least one sensor measurement exceeds a particular threshold comprising a second indication and transitioning from the low power standby state to a logging state, in response to the second indication, capturing the data corresponding to the downhole environment, and storing the data corresponding to the downhole environment.

Statement 17: A non-transitory computer-readable storage medium according to Statement 16, wherein the at least one sensor is at least one member selected from the group of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, and a gas-detection sensor.

Statement 18: A non-transitory computer-readable storage medium according to any of Statements 16 and 17, the operations further comprising receiving the first indication to transition from the powered-off state to the low power standby state from a computing device located on a surface above the downhole environment.

Statement 19: A non-transitory computer-readable storage medium according to any of Statements 16 through 18, the operations further comprising measuring, by the at least one sensor, the first indication to transition from the powered-off state to the low power standby state.

Statement 20: A non-transitory computer-readable storage medium according to any of Statements 16 through 19, the operations further comprising dynamically sensing in real-time, by the at least one sensor, the first indication to transition from the powered-off state to the low power standby state.

Statement 21: A system comprising means for performing a method according to any of Statements 1 through 7.

I claim:

1. A method comprising:
receiving, by at least one processor, a first indication to transition from a powered-off state to a low power standby state;
in response to the first indication, obtaining, by the at least one processor and from at least one sensor, at least one sensor measurement comprising data corresponding to a downhole environment;
determining, by the at least one processor, a second indication based on the at least one sensor measurement exceeding a predetermined threshold to transition from the low power standby state to a logging state, wherein the second indication occurs when the data corresponding to the downhole environment increases in value at a substantially exponential rate for a predetermined period of time and subsequently maintains a steady level for a predetermined period of time;
in response to the second indication, capturing, by the at least one processor, the data corresponding to the downhole environment; and
storing, by the at least one processor, the data corresponding to the downhole environment.

2. The method of claim 1, wherein the at least one sensor includes at least one of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, or a gas-detection sensor.

3. The method of claim 1, further comprising receiving the first indication to transition from the powered-off state to the low power standby state from a computing device located on a surface above the downhole environment.

4. The method of claim 1, further comprising measuring, by the at least one sensor, the first indication to transition from the powered-off state to the low power standby state.

5. The method of claim 1, further comprising dynamically sensing, by the at least one sensor, the first indication to transition from the powered-off state to the low power standby state.

6. The method of claim 1, further comprising dynamically sensing in real-time, by the at least one sensor, the first indication to transition from the powered-off state to the low power standby state.

7. The method of claim 1, wherein the predetermined threshold comprises one of an instantaneous threshold value, a rolling threshold value, a windowed threshold value, and a continuous threshold value.

8. A system comprising:
a downhole tool disposed in a wellbore, the downhole tool comprising at least one sensor;
at least one processor in communication with the downhole tool, the at least one processor coupled with at least one computer-readable storage medium having stored therein instructions, which when executed by the at least one processor cause the system to:
receive a first indication to transition from a powered-off state to a low power standby state;
in response to the first indication, obtain from the at least one sensor at least one sensor measurement comprising data corresponding to a downhole environment;
determine a second indication based on the at least one sensor measurement exceeding a predetermined threshold to transition from the low power standby state to a logging state, wherein the second indication occurs when the data corresponding to the downhole environment increases in value at a substantially exponential rate for a predetermined period of time and subsequently maintains a steady level for a predetermined period of time;
in response to the second indication, capture the data corresponding to the downhole environment; and
store the data corresponding to the downhole environment.

9. The system of claim 8, wherein the at least one sensor includes at least one of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, or a gas-detection sensor.

10. The system of claim 8, the at least one processor further to receive the first indication to transition from the powered-off state to the low power standby state from a computing device located on a surface above the downhole environment.

11. The system of claim 8, the at least one processor further to cause the at least one sensor to measure the first indication to transition from the powered-off state to the low power standby state.

12. The system of claim 8, the at least one processor further cause the at least one sensor to dynamically sense the first indication to transition from the powered-off state to the low power standby state.

13. The system of claim 8, the at least one processor further to cause the at least one sensor to dynamically sense in real-time the first indication to transition from the powered-off state to the low power standby state.

14. The system of claim 8, wherein the predetermined threshold comprises one of an instantaneous threshold value, a rolling threshold value, a windowed threshold value, and a continuous threshold value.

15. The system of claim 8, wherein the at least one processor is disposed in the downhole tool.

16. A non-transitory computer-readable medium having instructions stored thereon that, when executed by at least one processor, cause the at least one processor to perform operations comprising:
receiving a first indication to transition from a powered-off state to a low power standby state;
in response to the first indication, obtaining from at least one sensor at least one sensor measurement comprising data corresponding to a downhole environment;
determining a second indication based on the at least one sensor measurement exceeding a predetermined threshold to transition from the low power standby state to a logging state, wherein the second indication occurs when the data corresponding to the downhole environment increases in value at a substantially exponential rate for a predetermined period of time and subsequently maintains a steady level for a predetermined period of time;
in response to the second indication, capturing the data corresponding to the downhole environment; and
storing the data corresponding to the downhole environment.

17. The non-transitory computer-readable medium of claim 16, wherein the at least one sensor includes at least one of a pressure sensor, a motion sensor, an optical sensor, a flow sensor, a viscosity sensor, a density sensor, a temperature sensor, a Hall Effect sensor, a radioactive counter, a vibration sensor, a resistivity sensor, a conductivity sensor, an acoustic sensor, an ultrasonic sensor, a telemetry sensor, a torque sensor, an RPM sensor, a gyroscopic sensor, or a gas-detection sensor.

18. The non-transitory computer-readable medium of claim 16, the operations further comprising receiving the first indication to transition from the powered-off state to the low power standby state from a computing device located on a surface above the downhole environment.

19. The non-transitory computer-readable medium of claim 16, the operations further comprising measuring, by the at least one sensor, the first indication to transition from the powered-off state to the low power standby state.

20. The non-transitory computer-readable medium of claim 16, the operations further comprising dynamically sensing in real-time, by the at least one sensor, the first indication to transition from the powered-off state to the low power standby state.

* * * * *